(12) United States Patent
Yamaguchi et al.

(10) Patent No.: US 6,503,463 B2
(45) Date of Patent: Jan. 7, 2003

(54) PROCESS AND APPARATUS FOR TREATING DIOXINS

(75) Inventors: Sataro Yamaguchi, Aichi (JP); Yasuhiro Hasegawa, Osaka (JP)

(73) Assignee: Kabushiki Kaisha Y. Y. L., Tokyo (JP)

( * ) Notice: Subject to any disclaimer, the term of this patent is extended or adjusted under 35 U.S.C. 154(b) by 0 days.

(21) Appl. No.: 09/753,713

(22) Filed: Jan. 4, 2001

(65) Prior Publication Data

US 2001/0025782 A1 Oct. 4, 2001

(30) Foreign Application Priority Data

Jan. 7, 2000 (JP) ........................................ 2000-001653
Nov. 2, 2000 (JP) ........................................ 2000-336411

(51) Int. Cl.⁷ ................................................. B01J 19/08
(52) U.S. Cl. ................................... 422/186.01; 588/227
(58) Field of Search ........................... 422/186, 186.01; 588/227

(56) References Cited

U.S. PATENT DOCUMENTS

| | | | |
|---|---|---|---|
| 5,300,202 A | | 4/1994 | Moegel |
| 5,363,777 A | * | 11/1994 | Yoshimoto et al. .......... 110/214 |
| 5,397,551 A | * | 3/1995 | Won Sam .................... 422/186 |
| 5,720,927 A | | 2/1998 | Cripe et al. |

FOREIGN PATENT DOCUMENTS

| | | |
|---|---|---|
| DE | 4132955 C1 | 10/1991 |
| DE | 4327677 A1 | 8/1993 |
| DE | 19545563 A1 | 12/1995 |
| JP | 11-29346 | 2/1999 |

OTHER PUBLICATIONS

Patent Abstracts of Japan; vol. 018, No. 410; Aug. 2, 1994; & JP 06 122513 A.

* cited by examiner

Primary Examiner—Kishor Mayekar
(74) Attorney, Agent, or Firm—Armstrong, Westerman & Hattori, LLP

(57) ABSTRACT

A process and apparatus assuring low costs and high efficiency in practicing refuse incineration. A applying electromagnetic wave of a frequency band resonant with rotation or vibration of a specific substance e.g., dioxins molecule, thereby to heat the dioxins molecule selectively up to high temperature to remove the dioxins molecule by decomposition.

40 Claims, 10 Drawing Sheets

FIG. 2 (a)
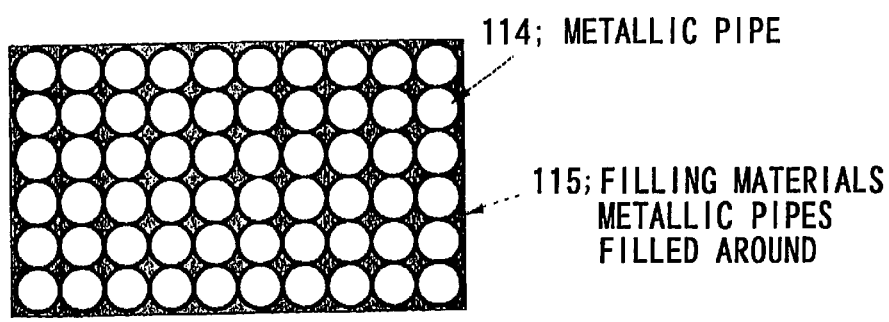
FIG. 2 (b)
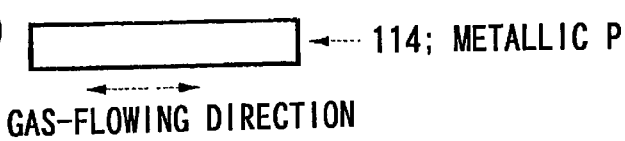
FIG. 2 (c)

PROCESS AND APPARATUS FOR TREATING DIOXINS

FIELD OF THE INVENTION

This invention relates to process and apparatus for treating a harmful substance, in particular, to process and apparatus for treating dioxins such as 2,3,7,8-tetrachlorodibenzo-p-dioxins.

BACKGROUND

Dioxins are referred to, for example, the following literature.

Reference 1: "An introduction to dioxins" translated by Ryota Fujiwara and Higashi Kido, edited by Masatoshi Morita, and published by JESC (Japan Environmental Sanitation Center) on June 1991 (Original document: U.S. EPA Research Reporting Series, "Dioxins").
1. <Structure and Production Cause of Dioxins>

Dioxins were synthesized at first in Germany in the mid-19th century, but their strong toxicity wasn't known until 1950s. Ever since, the toxicity of dioxins has been widely known through the news of frequently broken out occupational diseases and environmental pollution, Vietnam War and etc. in connection with dioxins, and studied widely. In 1990s, it has been known that dioxins spread out widely around their surroundings through the incineration of refuse/waste and other processes. Consequently, studies on the influence, measurement and removal method of dioxins have been suddenly required. To attain this end, these studies have become active, and the number of papers concerning dioxins is rapidly increased now.

At first, an outline of dioxins is given below. General chemical structure of dioxins may be represented as follows.

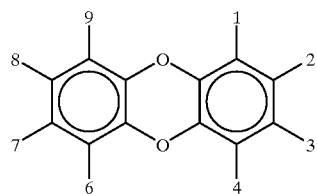

To the substitution sites of the numbers 1 to 4 and 6 to 9, chlorine and other halogen atoms, organic radical and hydrogen atom may be bonded. These kinds of compounds are usually called as "dioxins homologues", and 77 or more kind of isomers belonging thereto are known.

Among these dioxins homologues, the most remarkable compound in the field of environmental science and others is 2,3,7,8-tetrachlorodibenzo-p-dioxins ($C_{12}H_4Cl_4O_2$; which is abbreviated as "TCDD" to the 2-, 3-, 7- and 8-positions of which chlorine atoms are bonded.

TCDD has no functional group of high reactivity, thereby showing extremely high chemical stability, belongs to molecules soluble in high molecular weight paraffin, dissolves very little in water and most of organic solvents, and exhibits a colorless crystalline solid at room temperatures.

For synthesizing dioxins, various processes are known. Their reaction temperatures range from 180 to 400° C., and the reaction products are stable up to 700° C. Accordingly, it is necessary to apply heat up to temperatures of not less than 800° C., or of not less than 1150° C. under certain conditions to decompose dioxins.

Typical organic compounds potentially by-producing dioxins include chlorophenols and their derivatives; and hexachlorobenzene. These compounds are classified into the following 3 large groups.

The first: polyhalogenated phenols (1st group).

The second: o-halophenols, and halogen- and other-substituted phenols (2nd group).

The third: substances not classified into 1st and 2nd groups but possibly producing dioxins (3rd group). However, the possibility is low that the substances of the 3rd group produce dioxins.

As a material belonging to the above groups and commercially produced not less than 1,000 pounds in a year in U.S., there are known 12 kinds of chemical substances belonging to the 1st group, 16 kinds of chemical substances belonging to the 2nd group, and chemical substances of 50 kinds or so belonging to the 3rd group.

By the process for preparing pesticides such as insecticide and herbicide, dioxins are potentially by-produced. A large number of agricultural chemicals are known that contain dioxins at high concentration.

Recently, the precision of measuring dioxins has been improved to enable measuring a very small amount of dioxins. Consequently, the discovery has been made that dioxins are contained in agricultural chemicals and also in a basic chemical material of chlorophenols although the content contained in the latter material is very little. Moreover, it is known that not only these substances but also industrial wastes generated in the course of producing the same contain dioxins at high concentration. The aforementioned chemical material is used as a preservative of foods, crude rubber, leather or the like, or, otherwise as a raw material for preparing insecticides.

In addition to the above, these are applied directly to the human body in disinfecting swimming pool, home, hospital, bathroom and etc. All of these compounds are registered as an insecticide in EPA (Environmental Protection Agency) in U.S.

The fact that dioxins are produced according to the above process has been hitherto known. Recently, owing to the press and other media, attention has been paid to production and diffusion of dioxins originated from "combustion source", that is, waste/refuse incineration or other incinerating facilities. This finding is much owing to the improvement in the precision of measuring dioxins in Japan. However, before this time, 17 kinds of dioxins were detected by the analysis of floating particulate matter collected out of 3 municipal refuse-incinerating facilities in the Netherlands in 1977. Diffused dioxins are contained in combustion gas and fly ashes.

On the synthesis of dioxins through the step of burning, chemists of the Dow Chemical Company considered that many precursors of dioxins are produced through a complicated process such as burning, and suggested in 1978 that dioxins are synthesized naturally through the combustion of natural materials. Then, many chemical substances of the precursors have been studied until today.

It is necessary in decomposing dioxins by combustion at least to apply heat up to temperatures of not less than 800° C. and watch whether dioxins are regenerated or not at temperatures ranging from 180 to 400° C. when the temperature of the resultant decomposition product becomes lowered. It is also known that dioxins contained in fly ashes never decompose without heating up to around 1200° C.
2. <Dioxins Analyzing Method>

Because dioxins have very strong toxicity, microanalysis is required. General analyzing methods of dioxins include gas chromatography, mass spectrometry, UV spectrophotometry, ESR (electron spin resonance)

spectroscopy, low temperature phosphorimetry and etc. There is no analyzing method now that can provide both high sensitivity and selectivity at the same time applicable to substantially all the samples and surroundings.

It is said that the detection limit of dioxins is about 0.001 ppb (ppb: parts per one billion) at the present time. However, fluctuations in the measured value, which are large especially at low concentration, arise depending on measuring system, person and etc. On account of this, it is important to standardize the measurement, and for attaining this purpose, a joint study is started now by plural organizations such as research institutions and universities in Japan. Through the above activities, the measurement in and of itself is accepted as one of important research and development themes.

3. <Dioxins Exposure Accident to the Human Body>

Up to this time, there have been reported a lot of accidents caused by dioxins. Among them, an accident that happened in Meda, Italy on Jul. 10, 1976 is very terrible. In this accident, 300 g to 130 kg of dioxins were scattered around to pollute their surroundings and to cause 134 cases of children suffering from acute toxicity of chloracne. Further, 170 labors were directly polluted, and hundreds of animals were taken ill and killed in the worst case.

It is said that the largest-scale pollution which has ever happened in the world until now is the pollution caused by the United States Air Force burning 10,400 tons of a defoliant containing dioxins on the Pacific Ocean in 1977, and that this fixed the dioxins' background of the world.

Further, it is said that the birth of many malformations found in Vietnam is due to pollution caused by spraying the defoliant. However, some U.S. report told that there is no correlation between the sprayed defoliant and the birth abnormality. It is said that the largest-scale pollution caused in Japan is due to herbicides sprayed on water rice-fields.

Moreover, it is reported that many foods contain dioxins. It is also reported that dioxins are contained in: fishery products caught in South Vietnam; garden vegetables, fruits, milk and etc. which were polluted in the accident caused in Italy in 1976; and mother's milk tested recently not only in Japan but also in European countries.

The toxicity of dioxins is the strongest of all synthesized chemical substances (stronger than sodium cyanide). It may be no toxic material having stronger toxicity per molecule than that of dioxins except botulinus toxin.

It is reported that the exposure of dioxins causes diseases including melanoderma, myalgia, polyneuritis, cold tolerance lowering disease, liver malfunction accompanied by hepatomegaly in addition to the aforementioned chloracne. There is also a report referring to another diseases caused by the application of dioxins such as atrophy of the thymus, atrophy and necrosis of the testis, generation of abnormal spermatocyte, hypertrophic gastritis and etc. It was found that these diseases result from occupational exposure of highly densed dioxins and dioxins exposing test to Primates. Further, it was found by the animal test that dioxins exhibit teratogenicity, embryotoxicity, carcinogenicity, cocarcinogenicity, genotoxicity and other symptoms.

Recent research report tells that dioxins taken into the body are metabolized slowly. The rat test shows that the half-life of the excretion is about 17 days and that dioxins are discharged out through feces, urine and breath. This measurement has little error in spite that microanalysis is employed because of using a radioactive isotope. Further, the toxicity of dioxins has been studied biochemically, and mainly, the toxicity due to enzyme inhibition has been made clear thereby.

4. <Decomposition and Migration of Dioxins in a Dioxins-Containing Environment>

It is reported that biodegradation (organic decomposition by the complicated works of organisms) of dioxins is considerably little, but this doesn't mean that dioxins are never biodegraded. The result on the above study is different depending on the reporters and does give no clear solution now.

It is known that light of UV region is the most effective to light-decomposing (cutting a chemical bond by light) dioxins. The sunlight decomposition is the most effective of all the natural decompositions. On the other hand, there are many research reports telling experimental results of light-decomposing dioxins under various physical conditions.

Further, the condensation of dioxins also has been observed in the body of animals.

It is reported that plants also condense dioxins contained in soil, but the concentration of dioxins contained in fruits and leaves is lower than expected, which may probably be due to the sunlight decomposition of dioxins.

5. <Dioxins Treatment and Purge/Purification>

The treatment of Dioxins has been put into practice conventionally by dumping or filling into a disused pit or tunnel before covering the surface of the port with concrete, or by dumping into sea after solidification with concrete.

It is said that the cost accompanied by the above treatment is about half a million dollars in U.S. for treating the quantity of 3,000 barrel (1 barrel: 120 to 160 litters) held in drum cans so as not to leak out.

There are 3 methods mentioned below which have been conventionally applied on a large scale for removing dioxins.

The first method is removal by incineration that has been developed for the purpose of treating harmful substances having strong toxicity such as agricultural chemicals. The decomposition ratio is different depending on operational conditions of an incinerator. It is said that it takes 21 seconds at 700° C. and that a decomposition ratio of 99.5% can be achieved at 800° C. The United States Air Force put the largest-scale treatment into practice on the center of the Pacific Ocean using a large-sized incinerator mounted on a chemical tank vessel storing 10,400 tons (not less than 2 million gallon) of herbicide oranges. Its operational conditions are reported as follows. Mean burning temperature: 1,500° C., furnace residence time: 1 second, and the concentration of oxygen contained in flue gas: not less than 3%. The combustion efficiency under these conditions was estimated at 99.9%.

As an extension of the removal by incineration, a burning test using molten salt was put into practice in 1975 in U.S. This method has the merit of letting a sample keep at high temperatures for a long time, and as a result of the test, a high decomposition ratio was reported.

Further, decomposition by applying high frequency plasma was reported in 1978 at first. This method is for decomposing dioxins in a short time due to the high reactivity of high temperature plasma resulting from oxygen atoms, and its laboratory-level research was put into practice. It is reported that this method is effective to decomposing not only dioxins but also other stable chemical substances such as PCB etc.

As a decomposition method, photodecomposition is proposed in addition to the combustion. This is a method of applying UV light to a sample kept in an easily photodegradable state. Recently, proposal and experiment have been made to promote the decomposition of dioxins by emitting light of a frequency resonant with the dioxins to cause the isolation of the atoms of the dioxins (corresponding to IR wavelengths) into combustion gas.

The treatment with radial rays also has been studied. This can be regarded as one of the extended photodecomposition technologies. By applying $10^6$ rad of radial rays to dioxins mixed in a solvent of ethanol, acetone, dioxisane or the like, a decomposition ratio of 97% was achieved. However, it was pointed out from the results yielded by a series of experiments that this method is extremely ineffective for decomposing the dioxins mixture and causes the increase of costs. All the aforementioned methods belong to a physical method.

In addition to the above methods, a method of treating dioxins by combustion after absorption by activated carbon also has been studied for treating low enriched dioxins, but this method isn't applied on a large scale now.

The second method is a chemical one, and plural methods belonging thereto have been proposed.

These methods include, for example,
a) ozone treatment (blowing ozone into a solution containing dioxins),
b) decomposition with iodine chloride (decomposing dioxins by adding iodine chloride thereto after condensing dioxins and changing the condensed dioxins into colloid with a surfactant),
c) wet air oxidation (putting a sample into water before treating under pressures ranging from 40 to 140 atmospheres at temperatures ranging from 150 to 350° C. Recently, this method is called as "critical water treatment"),
d) catalytic dechlorination (reductively depriving chlorine atoms from dioxins using a catalyst), and the like.

However, all of these chemical treatments are in an experimental stage at pilot plant now, and not put into practice on a massive scale. Their characteristic point is to treat the whole contents simultaneously, and they become effective in case of containing dioxins at high concentration.

The third method is biological treatment. For example, dioxins treatment with bacteria is still in the basic research level now, and researches applying this treatment to soil, drainage system and the like are going on. Then, a water treatment apparatus is proposed that has been devised in many ways for increasing the activity of bacteria in soil. These researches are under way under the prerequisite of treating at low concentration.

Currently, dioxins contained in agricultural chemicals and the like have been checked very strictly to decrease their amount. However, the generation of dioxins in a refuse incinerator becomes a big subject of discussion now. This depends on a reason that many chemical substances become wasted out of home as a standard of living is improved to generate dioxins proportionally thereto in the incineration facilities through the refuse incineration process.

SUMMARY OF THE DISCOLSURE

The following is explanation of the problems occurring mainly in case of putting the aforementioned conventional methods of removing/treating dioxins into practice in a refuse-incinerating facility or the like.

In a refuse-incinerating facility, a great number of chemical substances are contained because of treating by combustion of various refuse wasted out of home and etc. Accordingly, there is a possibility that the chemical substances of the 1st and 3rd groups explained in the aforementioned paragraph 1 are mixed.

Further, in a refuse-incinerating facility, combustion temperature cannot be elevated so much. This depends on a reason that refuse is not always fit to be burnt. Accordingly, the combustion temperature may be around 800° C. at most. Further, the residence time of the combustion gas cannot be prolonged so much. Accordingly, it is expected also by the past experiments that the possibility of generating dioxins is high. It is recognized now that the surest treating method is to attach an afterburner to the chimney of an incinerator, to inject fuel such as petroleum and the like through the afterburner, and then to burn again at high temperatures.

Taking the above matters into consideration, the method stated in the above paragraph 5 is checked again as follows.

At first, the high temperature burning method is in a sense the same with that put into practice by the United States Air Force in the Pacific Ocean subject to being directed in all refuse-incinerating facilities. However, it takes too much cost for burning refuse by applying this method. This is caused by fuel cost required for heating up to high temperatures and the short life of an incinerator shortened by the high temperatures. Accordingly, it is difficult to put this method into practice.

On the other hand, the method using a molten salt or plasma is certainly effective in case of containing dioxins at high concentration, but this method also requires too much operational cost. Particularly, in case of applying plasma, temperature of the plasma-emitted spot exceeds ten thousand degree. This method is not practicable because high cost is required for raising temperatures. Accordingly, it is actually difficult to apply this method to refuse incineration. In case of raising up the temperature of electrons constituting plasma partially, it can be easily imagined that the decomposition ratio of dioxins becomes lowered.

Conventionally proposed photodecompositions, i.e., methods of applying UV rays, radioactive rays and IR rays are studied now. Among them, so far as the radioactive rays are concerned, introducing a radioactive generator, which emits very strong radioactive rays, into usual civil facilities like a refuse incineration facilities in itself causes problems in control and safety and substantial rise in treating cost thereby.

Though UV and IR rays are much absorbed by other molecules than dioxins in an incinerator (the absorbance of IR and UV rays is basically large in the air), improvement in efficiency of decomposing dioxins is expected if dioxins are contained at high concentration in the air. However, in this method, it is necessary to set up special lamps and laser oscillators for the emission of UV or IR rays, and the fact that the oscillating tube by itself is high in cost causes a big problem.

On the other hand, considering the cost of activated carbon and the property that activated carbon absorbs chemical substances in addition to dioxins, it will be necessary to review the aspect of costs arising in the separation by absorption with activated carbon in the future.

Next, the chemical and biological treatments referred to in the above paragraph 5 will be considered as follows. In case of the chemical treatment, all the contents are principally treated at the same time. Accordingly, refuse, which does not require such treatment in itself, are also treated inevitably. Thereby, it is expected that costs become very high.

On the other hand, the biological treatment cannot be applied in a refuse-incinerating facility because of using bacteria.

Accordingly, the present invention has been made in consideration of the aforementioned problems involved in the prior art. It is an object of the present invention to provide a process and apparatus for treating dioxins that assure low cost and high efficiency and are suitable for application to refuse incineration.

According to a first aspect of the present invention, decomposition of objective chemical substances to be removed such as dioxins is made by applying electromagnetic wave to an objective chemical substance and/or a material containing the objective chemical substance to heat the objective chemical substance to be removed selectively.

According to a second aspect of the present invention, decomposition of dioxins is made by applying electromagnetic wave to combustion gas generated and held in a refuse incinerator to heat selectively dioxins contained in the combustion gas. Further, decomposition of dioxins is made by applying electromagnetic wave to fly ashes in a refuse incinerator to heat selectively dioxins contained in the fly ashes.

According to a third aspect of the present invention, an electromagnetic wave oscillator is provided so as to apply electromagnetic wave emitted to a dioxin-containing combustion gas in an incinerator. Other applicable means and methods in the present invention for solving the aforementioned problems are just as disclosed in each of the appended claims.

BRIEF DESCRIPTION OF THE DRAWINGS

FIG. 2 is a view showing an electromagnetic wave cut filter employed in the 1st example.

PREFERRED EMBODIMENTS OF THE INVENTION

Figure 1:
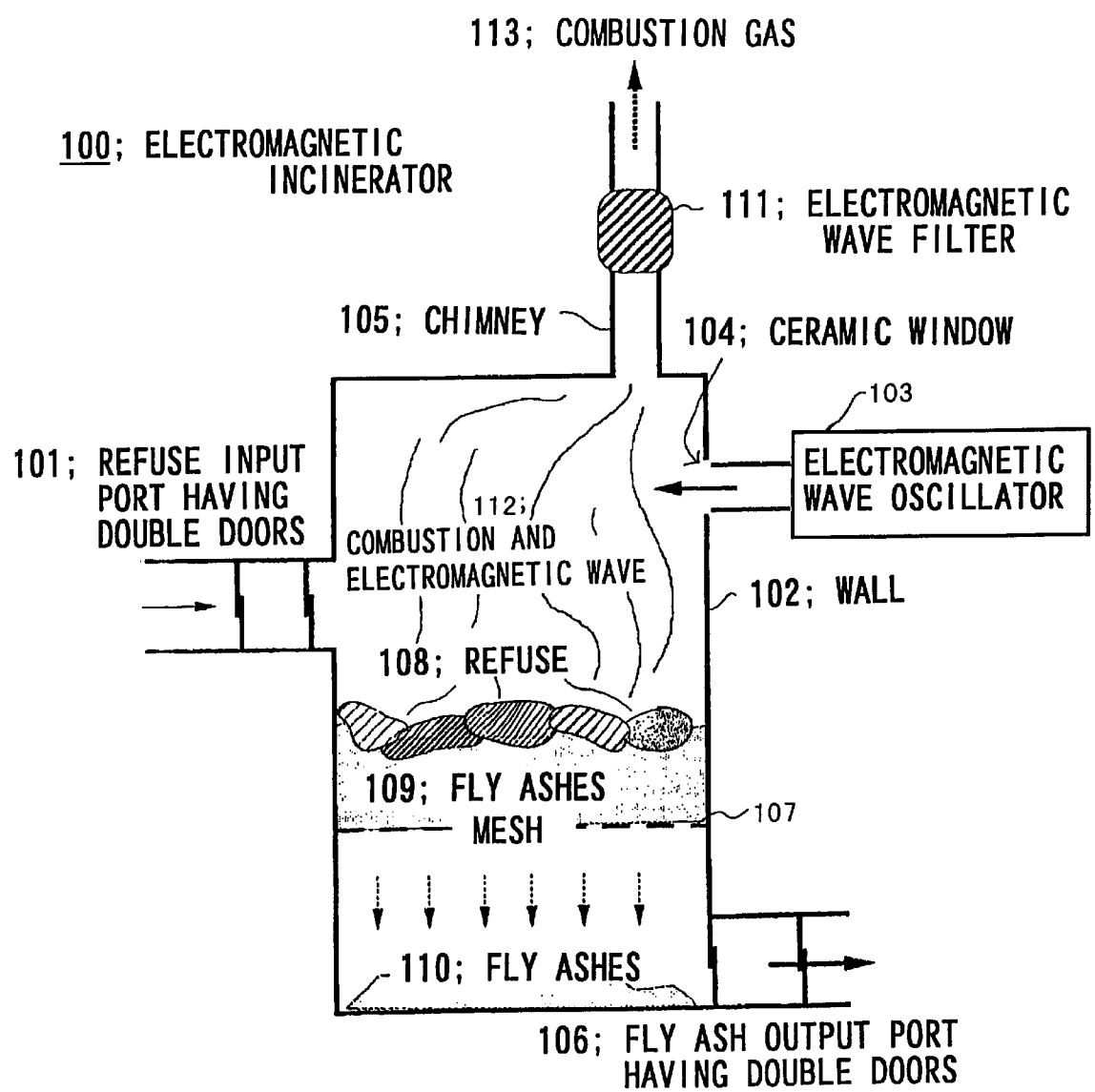
FIG. 1 is a view showing the 1st example of the constitution of the inventive incineration.

The embodiments according to each aspect of the present invention are just as disclosed in the corresponding dependent claims appended. The details of the inventive embodiments will be further explained below. The present invention provides a completely novel electromagnetic incinerator capable of decomposing and treating special chemical substances, in particular, dioxins among all by applying electromagnetic wave thereto.

The principle in the inventive treatment of the special chemical substances, in particular, dioxins among all is to selectively heat only specific molecules such as dioxins up to high temperatures by applying electromagnetic wave, which has a frequency band resonant with rotation or vibration of the specific molecule, to the molecules held in an incinerator. Namely, the whole combustion gas isn't raised up but only specific molecules are raised up to high temperatures. Accordingly, it is unnecessary to raise the temperature of the whole combustion gas so that large power is no more necessary.

Further, the present invention has a feature that it is possible to heat up the objective substance to very high temperatures because in principle there is no upper limit of temperatures up to which a heating object is heated likewise the case where high-frequency emission is applied to produce plasma.

The wavelength of electromagnetic wave applied in the conventional photodecomposition of the chemical substances such as dioxins ranges from UV to IR, which was made clear previously by experiments.

On the contrary, in the process of the present invention, electromagnetic wave in the region of microwaves is applied like an electronic oven. Inside the electronic oven, electromagnetic wave resonant with the rotation frequency of water is emitted to heat water molecules selectively and never to heat vessels nor cooking utensils. Even if the conversion of electric energy into electromagnetic radiation is low (usually, 35% or so), cooking time can be saved on account that the energy conversion is finally high as compared with the case of warming a cooking utensil and indirectly foods by heat using gas or other fuel.

The conventional method of applying IR rays also directly decomposes chemical substances such as dioxins according to the principle of resonance absorption, which, however, is largely different in the following two points of effects.

(1) At first, IR rays are largely absorbed by the air and combustion gas. Accordingly, other molecules absorb IR rays before specific molecules such as dioxins do so. Consequently, efficiency of the decomposition is low.

In contrast with this, the electromagnetic wave applied in the present invention is little absorbed by general gas such as air and the like.

(2) The second point relates to the efficiency in conversion of electric energy into IR rays. The oscillation frequency of a domestic electric oven is 2.45 GHz, a magnetron is used for the oven, and the conversion efficiency is about 35%. Generally, the conversion efficiency in case that electromagnetic wave is in the region of microwaves shows a value of this degree. However, the conversion efficiency of laser and other oscillators is lower than this value.

The advantage of applying microwave is very great in view of the conversion efficiency like this.

Further, complicated molecules like dioxins are resonant with a large number of frequencies. Accordingly, it is easy to prepare an oscillator capable of emitting microwave having a required resonance frequency or frequencies.

In one aspect of the present invention, the inventive treating apparatus has an electromagnetic wave oscillator, and specific chemical substances (in particular, dioxins) are decomposed through the step of applying electromagnetic wave emitted by the electromagnetic wave oscillator to combustion gas generated and held in an incinerator and containing specific chemical substances such as dioxins.

The treating apparatus of the present invention may be equipped with an electromagnetic wave filter for preventing (suppressing) electromagnetic radiation from passing through a chimney at a chimney section for discharging the combustion gas.

Further, the treating apparatus of the present invention may have a cavity for applying electromagnetic wave positioned inside the chimney section for discharging combustion gas generated and held in an incinerator upstream of the electromagnetic wave filter. In this treating apparatus, combustion gas generated in the incinerator is introduced into the cavity, exposed inside the cavity to electromagnetic wave emitted by the electromagnetic wave oscillator, and thereafter exhausted as incineration gas through the electromagnetic wave filter.

The electromagnetic wave (cut) filter (or shield) may be equipped with plural open-ended metallic hollow pipes each aligned in the flowing direction of the combustion gas. The diameter of the pipe is smaller than the wavelength of the electromagnetic wave; with the length of the pipe being longer than the wavelength.

Moreover, the treating apparatus of the present invention may have a sensor, disposed in the chimney part, for detecting the concentration of dioxins contained in the exhausted gas, and a control unit for variably controlling the magnitude of electromagnetic wave applied to the combustion gas generated in the incinerator depending on the output of the sensor.

The treating apparatus of the present invention may be equipped with a fan for scattering combustion gas and electromagnetic wave in the incinerator, and a motor for driving the fan.

Further, the treating apparatus of the present invention may have an electromagnetic irradiation unit applying electromagnetic wave to fly ashes generated (and held) in the incinerator. With regard to the refuse (waste) treatment by applying electromagnetic wave, for instance, JP-A-11-29346/1999 (The term "JP-A" used herein means "unexamined published Japanese patent application") discloses an adsorbent, oxidative, catalytic agent, which can decompose harmful substances such as dioxins in the course of refuse incineration to remove them and which make ashes harmless thereby, and a process for preparing same. In the refuse treatment disclosed in this document, ashes such as burned ash, fly ash are sieved to remove contaminants; dried by heating; pulverized after removing metals with a magnetic separator; mixed with raw materials of bentonite, zeolite, glass cullet and sludge-burned ash resulting from excretal and other sludges; granulated while being moistened after kneading to form a base material. The base material, after granulation, is treated by sintering and firing at temperatures ranging from 600 to 1300° C. after predrying. The thus treated base material is cooled down to 800° C. Thereafter, treatment of sterilizing and deodorizing is applied to the base material through the step of exposing to electromagnetic wave or passing through an ozone atmosphere. In the above method, electromagnetic wave is applied for the sake of sterilizing and the like. As such, the process never aims at decomposing and removing dioxins through the step of exposing dioxins contained in fly ashes to electromagnetic wave of a frequency resonant with the dioxins molecule.

In one aspect of the inventive apparatus, the inside wall of the incinerator is made of ceramics; and the outside wall has a metallic member made of electromagnetic radiation shielding metal.

Further, in the present invention, the refuse input port and the fly ash output port of the incinerator have a double door structure.

In the present invention, a re-combustion chamber for inputting and combusting again the combustion gas may be installed to exhaust the gas re-combusted in the re-combustion chamber, and electromagnetic radiation emitted by an electromagnetic wave oscillator may be directed in the inside of the re-combustion chamber.

In the present invention, fuel may be introduced into a cavity positioned inside the incinerator to combust the combustion gas a gain.

In the present invention, a magnet field generator may be arranged around the re-combustion chamber and/o r the cavity, and magnetic field ma y be formed therewith inside the re-combustion chamber or inside the cavity.

EXAMPLES

Examples of the present invention are explain ed below in reference to the accompanying drawings. FIG. 1 is a view showing the constitution of an electromagnetic incinerator (incineration-treating apparatus) 100, which is one example of the present invention. Into the incinerator, refuse 108 is input through a refuse input port 108 having double doors. The double doors are designed for preventing the leak of electromagnetic wave directed into the incinerator through the input port. Also a portion out of which fly ashes 110 fallen down through a sieve (mesh) 107 and accumulated on the bottom of the incinerator after incineration are taken, i.e., fly ash output port 106 has also double doors. Though it depends on the scale of the incinerator, incineration is usually performed in an incinerator after bringing refuse thereto using a crane or the like in such a manner as the refuse become easily burnt while the operator monitors the burning state of the refuse held in the incinerator by watching TV of industrial use or the like.

In one embodiment of the present invention, electromagnetic wave having a band of frequencies (microwave region), at least one of which is resonant with dioxins molecules, is emitted by an electromagnetic wave oscillator 103 toward the inside of the incinerator and applied to the dioxins. A window made of heat resisting material (ceramic window 104) is attached to the wall 102 to prevent combustion gas 112 from flowing backward into the electromagnetic wave oscillator 103. Electromagnetic wave emitted by the electromagnetic wave oscillator 103 is applied through the ceramic window 104 into the incinerator. The electromagnetic wave travels from the electromagnetic wave oscillator 103 to the ceramic window 104 through an appropriate medium such as coaxial cable, wave-guide or the like depending on the frequency of the electromagnetic wave. To simplify a drawing, single electromagnetic wave oscillator is shown in FIG. 1, but of course, plural electromagnetic wave oscillators may be facilityd so as to surround the sidewall of the incinerator. Necessary shields are applied to the joint of the oscillator 103 and a wave-guide portion through which electromagnetic wave oscillated by the oscillator is guided into the inside of the incinerator, to the joint of the guide and the wall 102 (ceramic wall), and to the joint of other two portions if necessary.

In the thus constituted embodiment, a dioxins molecule is heated selectively in the incinerator by means of the electromagnetic wave. Consequently, the decomposition of the dioxins advances rapidly on account that a dioxins molecule is selectively heated up to high temperatures although the mean temperature of the combustion gas is almost the same with that in the conventional incinerator.

In one embodiment of the present invention, electromagnetic wave is introduced into the incinerator, and an electromagnetic wave filter (shield) 111, through which exhausted gas passes but electromagnetic wave doesn't, is placed in the midway of a chimney 105 in order to prevent the leak of electromagnetic radiation out of the chimney 105.

FIG. 2 is a schematic view showing one exemplary constitution of the electromagnetic wave filter 111 placed in the midway of the chimney 105. FIG. (2a) is a cross-sectional top view of the electromagnetic wave filter. FIGS. (2b) and (2c) represent cross and longitudinal sections of a metallic pipe 114. As shown in FIG. (2a), the electromagnetic wave filter has such a structure that metallic pipes 114 are arranged in the form of array, and predetermined heat-resistant and anticorrosive filling materials (filler) 115 are filled up around the metallic pipes 111. The diameter of the metallic pipe 111 is the same with or little smaller than the wavelength of the electromagnetic wave; and the length, at least 2 times longer than the wavelength. In this condition, the electromagnetic radiation cannot pass through the electromagnetic wave filter 111, and the electromagnetic wave filter works as a filter (shield) of stopping the passage of the electromagnetic radiation. The wavelength of the microwave corresponding to the aforementioned frequency of 2.45 GHz is about 10 cm so that the electromagnetic wave filter can be prepared by simply bundling many pipes of about 10 cm in diameter and about 30 cm in length.

Because of this constitution, the electromagnetic wave filter 111 doesn't let the electromagnetic radiation but let exhausted gas (combustion gas) pass through. In this case, the property of metallic materials that reflect electromagnetic radiation and don't let electromagnetic radiation pass through is made use of. However, in the case that the temperature of combustion gas is high and that metals are in danger of corroding, the surface thereof may be coated with high-temperature resistant (heat resistant) and anticorrosive material such as ceramic or the like.

Further, it is known as a result of the past experiments that dioxins contained in fly ashes are hard to be decomposed even at temperatures higher than the decomposition temperature of dioxins contained in the combustion gas.

In the present invention, a high decomposition efficiency (ratio) is expected in decomposing not only dioxins contained in combustion gas but also dioxins contained in fly ashes because the residence time in the incinerator of electromagnetic wave applied to fly ashes is expected longer than that of electromagnetic wave applied to combustion gas. Of course, the above embodiment can be modified in such a way that an electromagnetic wave irradiation unit is placed so as to be able to direct electromagnetic radiation to the facility where fly ashes 109 are accumulated as discussed in the following 3rd example.

Figure 3:
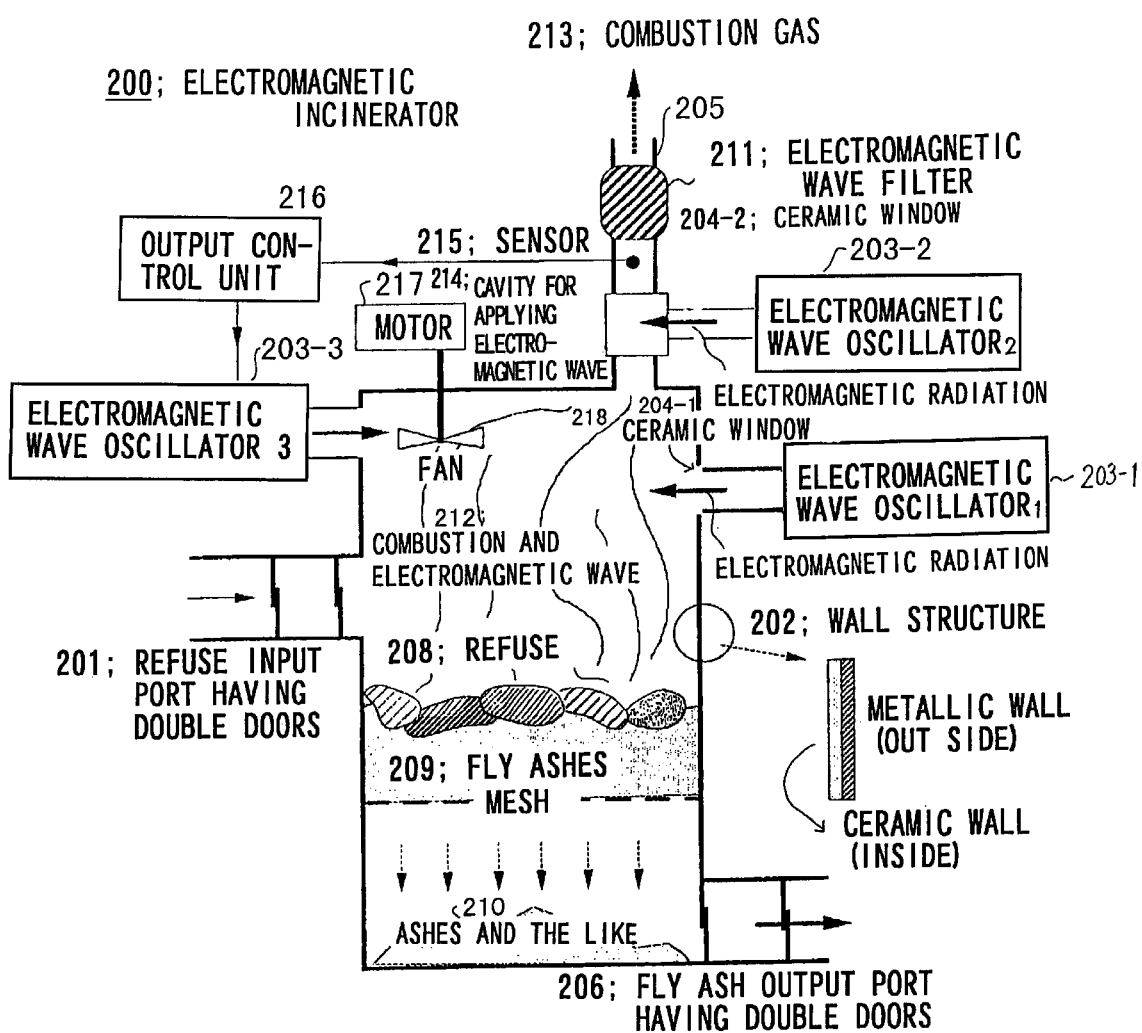
FIG. 3 is a view showing the 2nd example of the constitution of the inventive incineration.

Another example of the present invention is explained below. FIG. 3 is a view showing the constitution of the 2nd example of the inventive electromagnetic incinerator 200. Refuse contains various chemical substances. Consequently, the kind of toxic substances produced in the course of combustion is also varied in the nature of things. The 2nd example of the inventive electromagnetic incinerator is applicable in the case of decomposing not only dioxins but also other chemically synthesized products showing, e.g., high carcinogenicity. The molecular structure of dioxins basically contains a benzene ring as shown in the above. Benzene in itself shows very high carcinogenicity, and the decomposition of benzene using incinerators or the like is also wanted.

In the 2nd example of the inventive electromagnetic incinerator, dioxins and benzene can be decomposed by applying electromagnetic wave (microwave) having a frequency (or frequencies) resonant with a benzene ring. Accordingly, it is necessary to apply microwave of frequencies each resonant with different chemical substance in order to treat all the different chemical substances at the same time. In order to satisfy this requirement, different electromagnetic wave oscillators each of which oscillates electromagnetic wave having a different frequency from each other or from one another may be provided. In order to keep the intensity of electromagnetic wave uniformly in the incinerator, a plurality of oscillators may be provided which oscillate electromagnetic wave having the same frequency. FIG. 3 shows 3 electromagnetic wave oscillators 203-1, 203-2 and 203-3 provided. of course, these oscillators may oscillate electromagnetic wave of a different frequency from one another.

Further, a stirring fan 218 may be placed and rotated in the incinerator to spread combustion gas and electromagnetic wave throughout the incinerator as uniformly as possible. Thus the microwave is spread all over the combustion gas 212. This makes all the combustion gas 212 exposed to microwave. A motor 217 rotates to drive the fan 218.

Moreover, a cavity 214 for applying electromagnetic wave (microwave) may be placed in the midway of a chimney section 205 (i.e., chimney or a guide conduit to the chimney) to apply electromagnetic wave oscillated by the electromagnetic wave oscillator 203-2 to combustion gas contained in the cavity 214.

Inside the cavity 214, the magnitude of the electromagnetic wave becomes very strong. As a result, selective heating of dioxins, benzene or the like is done more effectively.

Still more, a system is connected to the incinerator that detects a substance contained in the gas exhausted out of the incinerator with a sensor 215 placed in, for example, the chimney section 205, analyzes the detected result on real time using an output control unit 216, and controls the output of the electromagnetic wave oscillator 203-3 or else (electromagnetic radiation power) according to the analyzed result. The output control unit 216 performs such feedback control that the output power of the electromagnetic wave oscillator 203-3 is increased in case that the concentration of dioxins is higher than a reference value, and decreased in case that the concentration of dioxins is lower than a reference value. By this constitution of the system, the decomposition by combustion can be promoted more effectively.

Next, the wall 202 structure of the incinerator 202 will be explained below. The wall of the conventional incinerator is made of heat resistant, anticorrosive material (mainly ceramic or refractory material). But, in general, it doesn't absorb microwave so much. Accordingly, microwave is in danger of leaking out through the wall. The incinerator of the present invention has a radiation shielding structure that the inside wall is a ceramic refractory wall and the outside wall is made of radiation shielding material (metallic wall). Further, the inside wall is preferably made of materials absorbing little microwave radiation.

Figure 4:
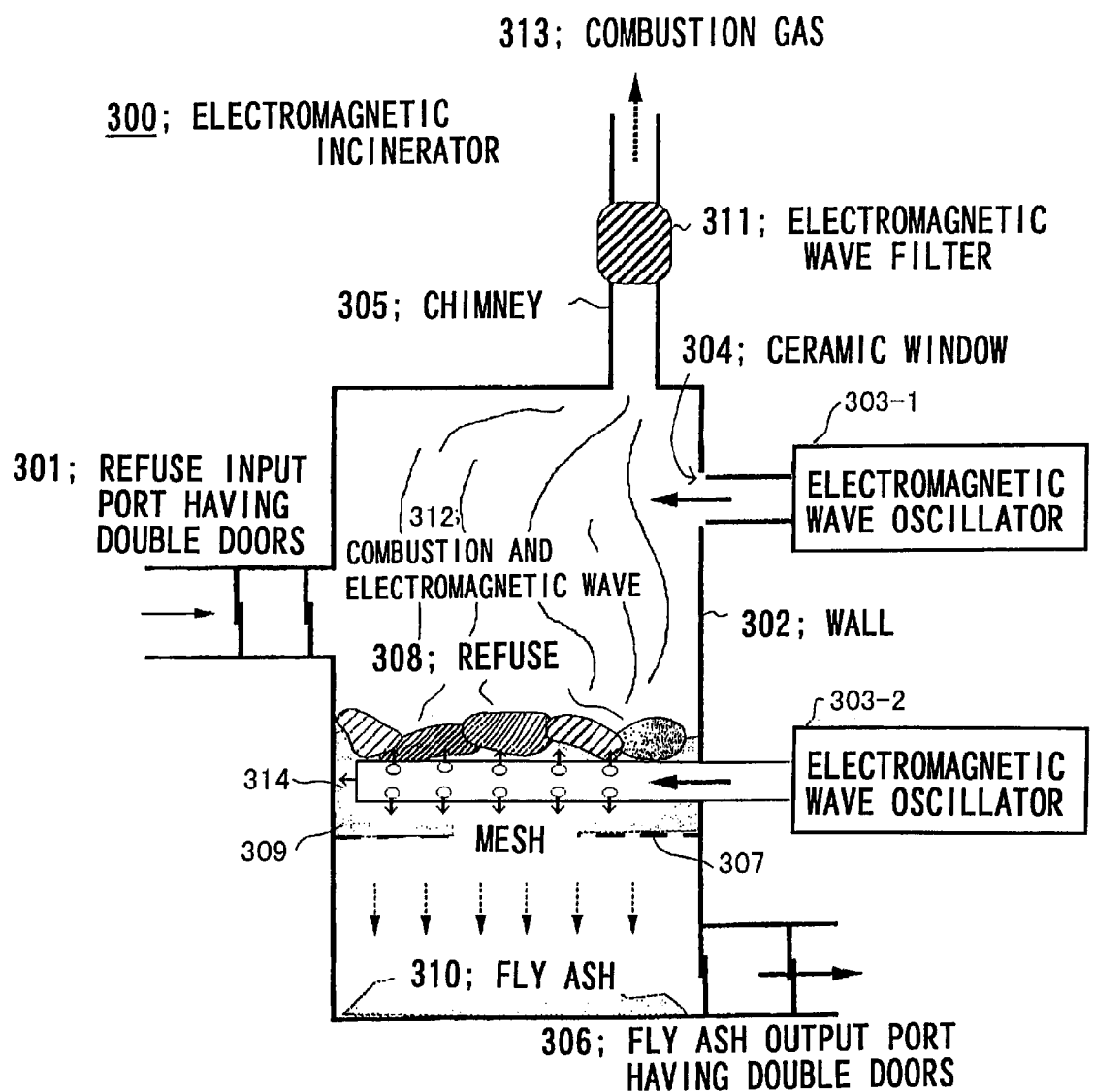
FIG. 4 is a view showing the 3rd example of the constitution of the inventive incineration.

FIG. 4 is a view showing the constitution of the inventive refuse incinerator employed in the following 3rd example. Referring to FIG. 4, the refuse incinerator of the present invention employed in the 3rd example has constitution that electromagnetic wave is directed from an electromagnetic wave oscillator 302-2 through an electromagnetic wave-guide 314 to fly ashes 309 and decomposes dioxins contained in the fly ashes 309 by heating up to high temperatures. In this case, a stirrer for stirring the fly ashes 309 may be provided. The electromagnetic wave-guide 314 has a lot of electromagnetic irradiation ports (holes) covered with electromagnetic wave permeating materials on the side and at the end.

Further, with regard to the constitution of applying electromagnetic wave to combustion gas generated and held in the incinerator, it is needless to say that plural wave-guides having the same constitution of the wave-guide 314 may be arranged inside the incinerator together with a ceramic window 304 through which electromagnetic wave is applied to combustion gas inside the incinerator. Accordingly, the incinerator of the present invention may have such constitution that one or more electromagnetic wave-guides, which is/are a part of electromagnetic irradiation means and shortened to "wave-guide" sometimes, may be placed in the incinerator the inside of which is filled with combustion gas 312 during combustion, whereby electromagnetic wave is applied through the irradiation ports of the electromagnetic wave-guide to the combustion gas. In this case, the irradiation ports of the wave-guide are sealed with an electromagnetic wave permeating material as hereinabove mentioned in order that the combustion gas doesn't flow upstream toward the electromagnetic wave oscillator side. Furthermore, the electromagnetic wave-guide 314 on the portion placed in the incinerator is coated by heat resistant, anticorrosive materials.

Figure 5:
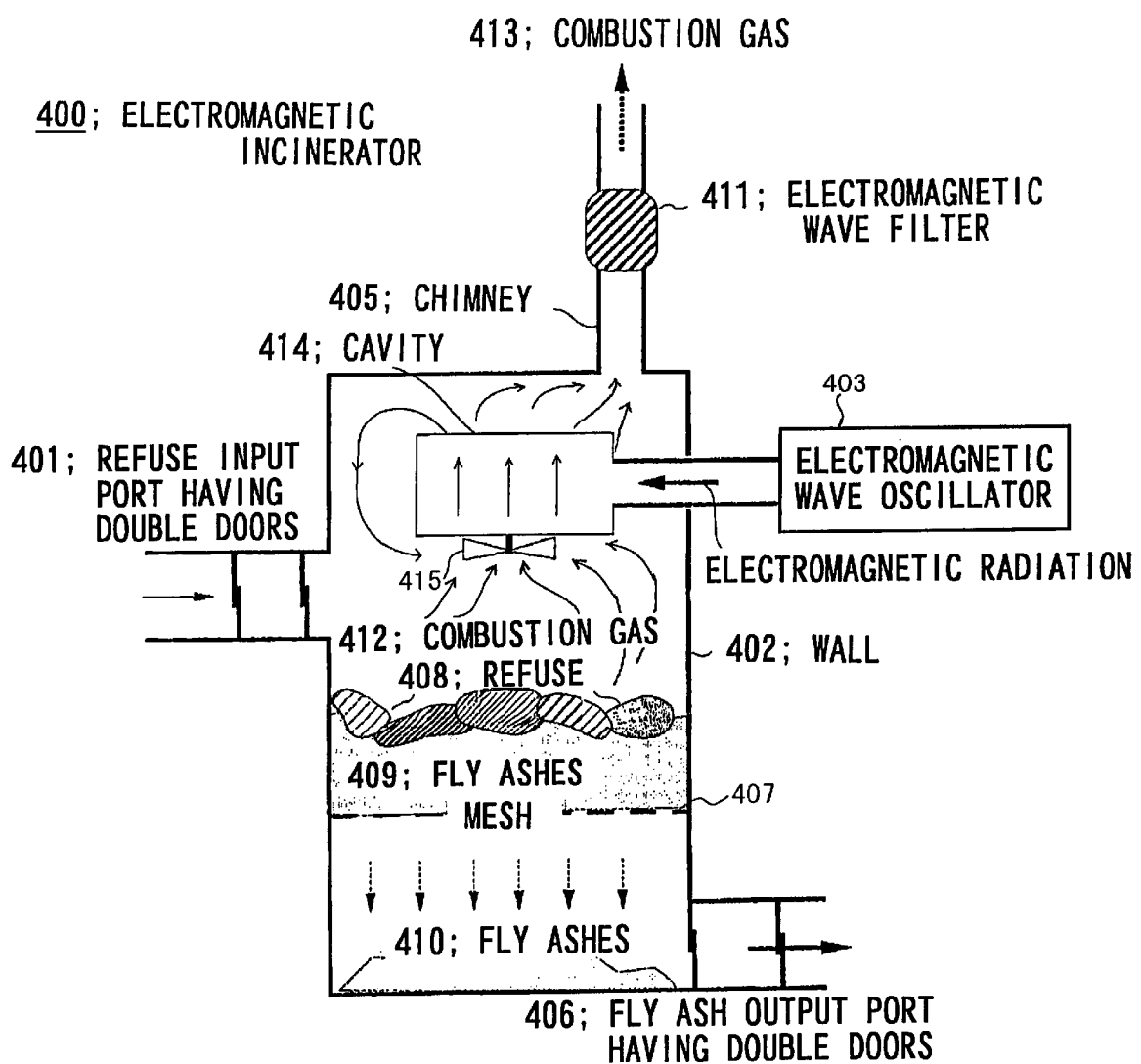
FIG. 5 is a view showing the 4th example of the constitution of the inventive incineration.

FIG. 5 is a view showing the constitution of the inventive refuse incinerator employed in the following 4th example. Referring to FIG. 5, the refuse incinerator of the present invention employed in the 4th example has therein a cavity 414 for applying electromagnetic wave termed as "electromagnetic wave cavity". Combustion gas 412 generated and held in the incinerator is introduced into the cavity 414 located in the incinerator with a suction means such as a fan 415 or the like. Electromagnetic wave output by an electromagnetic wave oscillator 403 is applied to the combustion gas introduced into the cavity 414. Thereafter, the combustion gas is discharged out of the cavity 414. A part of the discharged gas is recycled again into the cavity 414 and exposed to the electromagnetic wave output by the oscillator 403 to repeat the process of decomposing and removing dioxins. Thereby the removal ratio of dioxins is improved. The rest part of the discharged gas is exhausted through an electromagnetic wave (shielding) filter 411 as incineration gas.

FIG. 5 focuses only on the cavity 414 and the oscillator 403 in order to explain the feature of the 4th example of the present invention. However, another electromagnetic wave oscillator may be placed to direct electromagnetic radiation through a ceramic window toward the inside of the incinerator in the same way as the constitution shown in FIG. 1 as a matter of course. Further, it is needless to say that the number of the combination of the cavity 414 and the oscillator 403 is not limited to one, but plural pairs of the combinations are possible. Moreover, a passage of gas formed inside the cavity 414 may be curved to increase the residence time of gas, and a duct for guiding gas may be attached if necessary.

Of course, it is possible to combine freely the constitutions of the above examples shown in FIGS. 1 and 2 to 4, for example, in such a way as to facility a cavity for applying magnetic wave inside the incinerator and chimney.

The present invention is applicable to a refuse incinerator and also to incinerators of exclusive use, for example, the herbicide incinerator of the United States Air Forces that was used in the past time. In these incinerators, the concentration of chemical substances to be decomposed by combustion is high so that high efficiency of the decomposition can be expected. The present invention is also applicable to the treatment of PCB (polychlorinated biphenyl) or the like that is put in question now.

Figure 6:
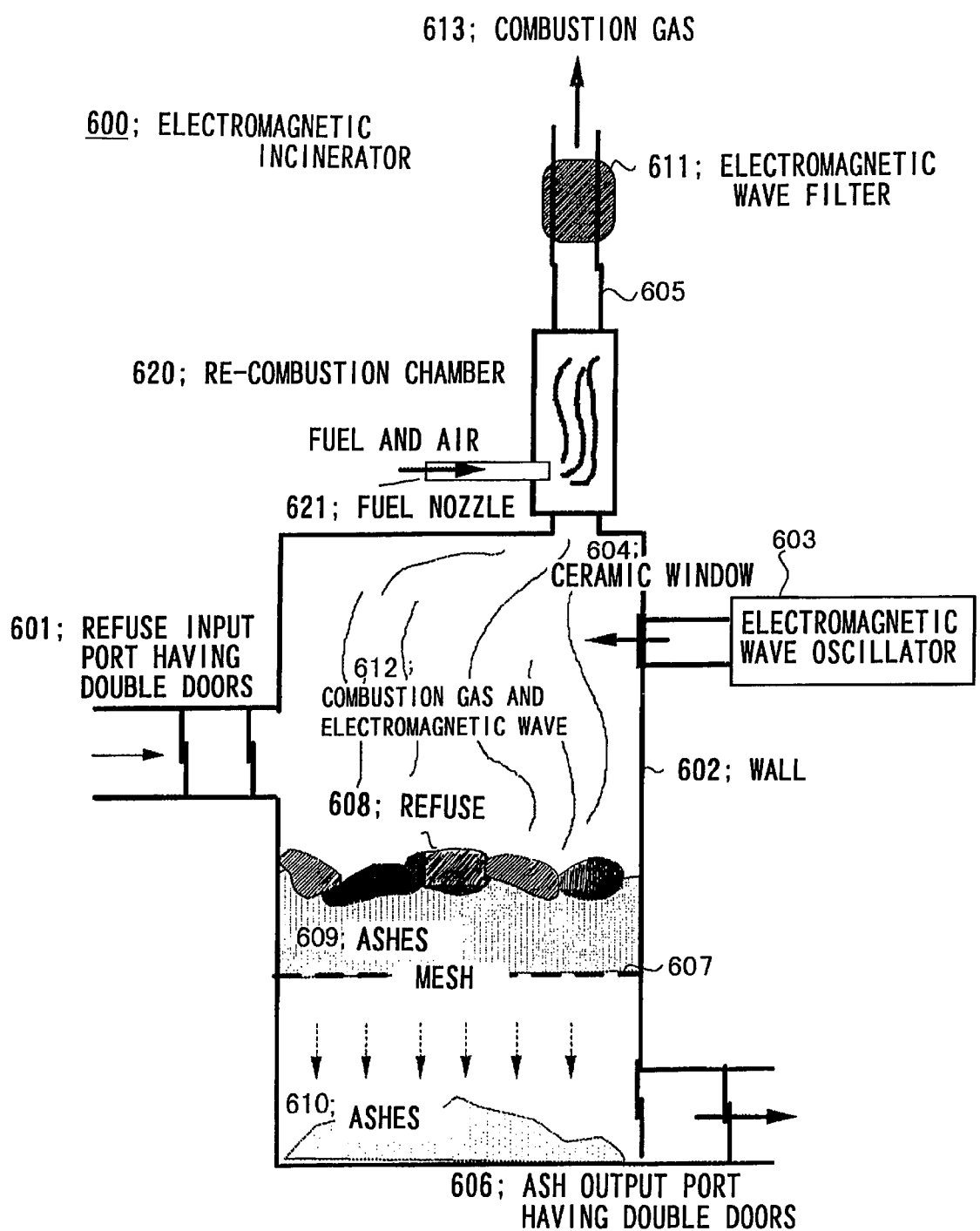
FIG. 6 is a view showing the 5th example of the constitution of the inventive incineration.

FIG. 6 is a view showing the constitution of the inventive refuse incinerator employed in the following 5th example. Referring to FIG. 6, the refuse incinerator of the present invention employed in the 5th example has a re-combustion (after-burning) chamber 620 for inputting and re-combusting combustion gas discharged out of the incinerator in the midway of a chimney 605. The gas re-combusted in the re-combustion chamber 620 is exhausted through an electromagnetic wave filter 611 out of the opening of the chimney 605. Into the re-combustion chamber 620, fuel and air are fed through a fuel nozzle 621. The efficiency of removing dioxins can be improved by burning combustion gas again at high temperatures in this way.

Figure 7:
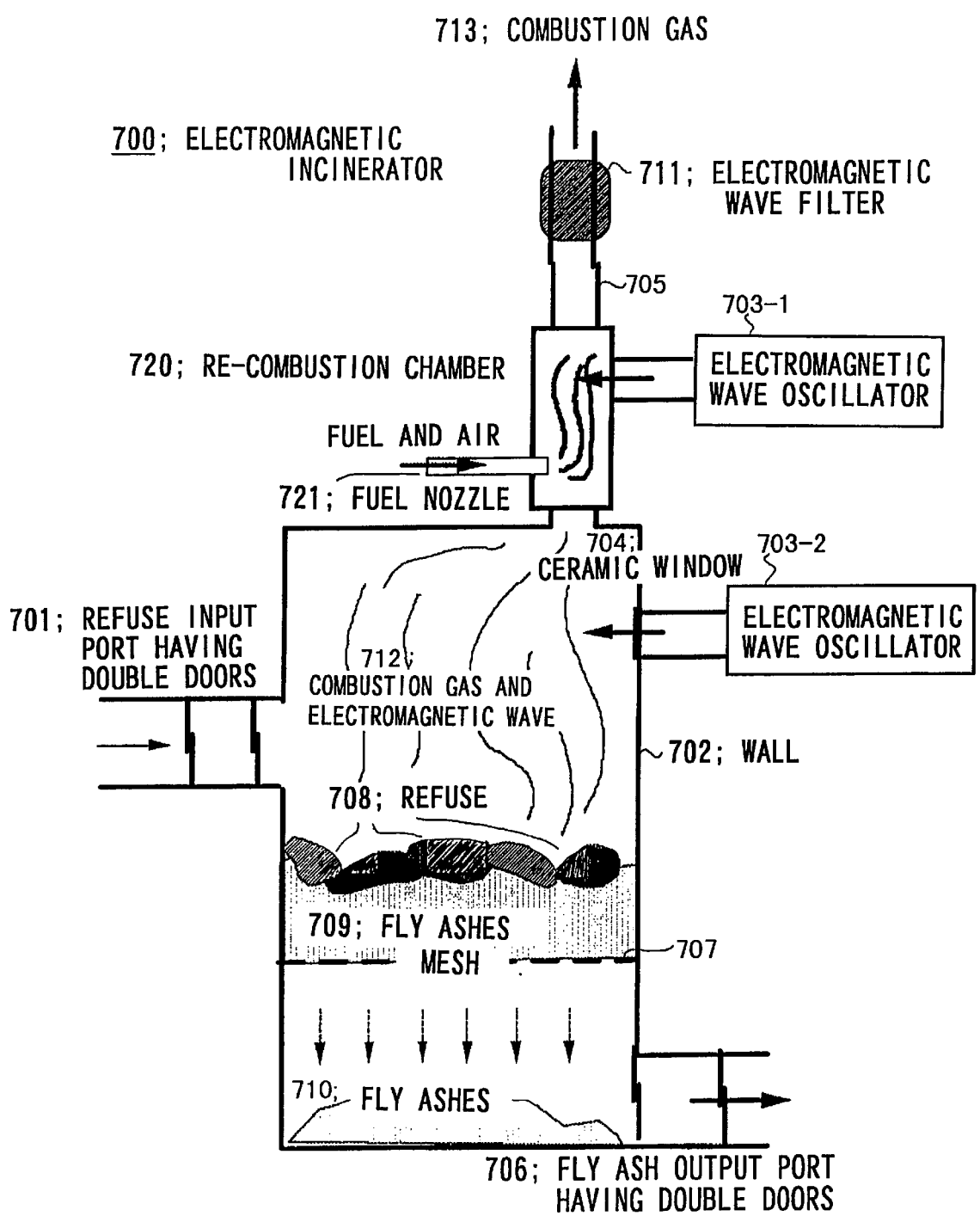
FIG. 7 is a view showing the 6th example of the constitution of the inventive incineration.

FIG. 7 is a view showing the constitution of the inventive refuse incinerator employed in the following 6th example. Referring to FIG. 7, in the refuse incinerator of the present invention employed in the 6th example, electromagnetic wave is directed out of an electromagnetic wave oscillator 703-1 to the inside of the re-combustion chamber 720. The re-combustion chamber 720 may have a cavity-like structure.

The re-combustion chamber 720 is placed before electromagnetic wave arriving at the electromagnetic wave filter 711, and discharged gas is exhausted through the filter 711 after removal of dioxins by applying electromagnetic wave.

Figure 8:
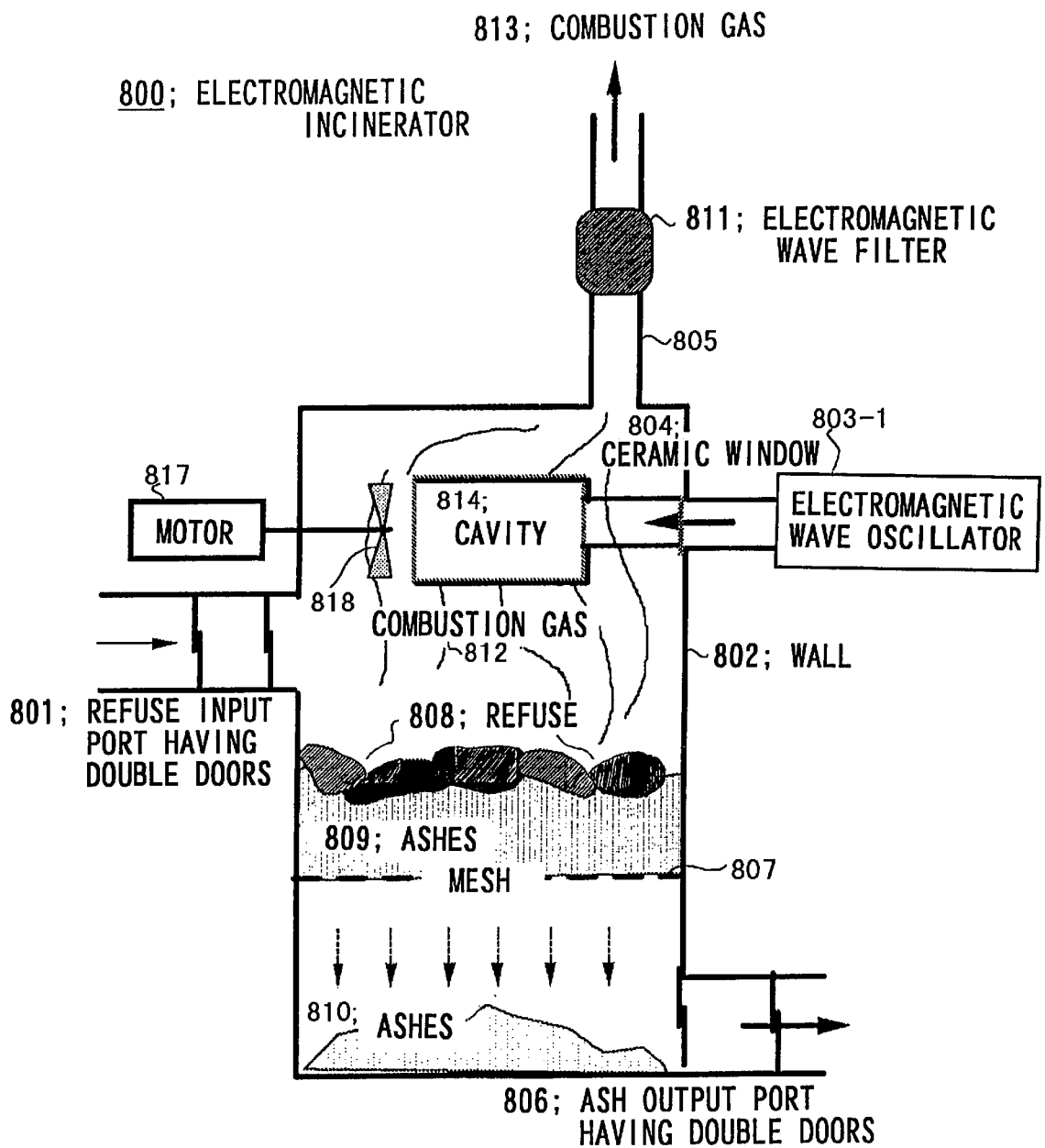
FIG. 8 is a view showing the 7th example of the constitution of the inventive incineration.

FIG. 8 is a view showing the constitution of the inventive refuse incinerator employed in the following 7th example. Referring to FIG. 8, in the refuse incinerator of the present invention employed in the 7th example, a specific cavity (subcavity) 814 is installed. A fan 818 rotated by driving a motor 817 positioned outside the incinerator and functioning as circulating combustion gas is placed near the cavity in such a way that the rotation axis of the fan 818 becomes horizontal with the ground. Combustion gas 812 generated and held in the incinerator is introduced into the cavity 814 and exposed inside the cavity 814 to electromagnetic wave output by an electromagnetic wave oscillator 803-1. The combustion gas discharged out of the cavity 814 via outlet ports (not shown) is charged again into the cavity 814 with the fan 818. Thus, combustion gas is circulated to improve the efficiency of decomposing dioxins. In the refuse incinerator of the present invention employed in the 7th example, fuel may be introduced into the cavity to burn combustion gas again.

Figure 9:
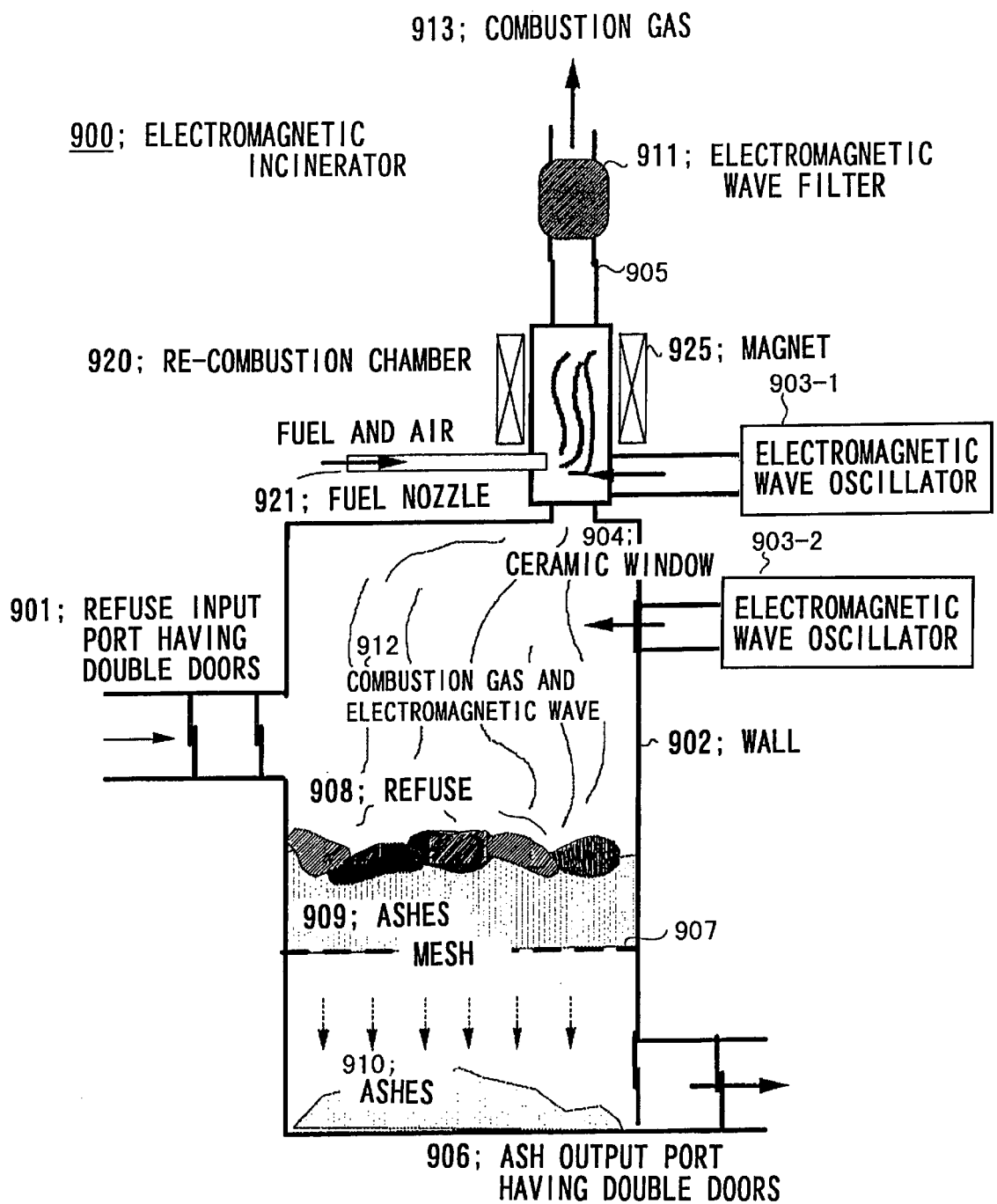
FIG. 9 is a view showing the 8th example of the constitution of the inventive incineration.

FIG. 9 is a view showing the constitution of the inventive refuse incinerator employed in the following 8th example. Referring to FIG. 9, the refuse incinerator of the present invention employed in the 8th example is the same with that employed in the above 5th example shown in FIG. 6 except that a magnetizer is added. A magnet field generator (magnet) 925 is placed around a re-combustion chamber 920 to form magnetic field inside the chamber 920. The inside of the chamber 920 is exposed to electromagnetic wave emitted by an electromagnetic wave oscillator 903-1. By the magnetic field formed inside the chamber 920, the absorption of electromagnetic wave into combustion gas increases. Thereby, the efficiency of removing dioxins contained in the combustion gas is improved. The chamber 920 is comprised of a cavity for applying electromagnetic wave. It is preferable that this cavity at least on the inner face thereof has the surface of material that exhibits a function of catalytic decomposition or a coating layer made of catalytic material. The object is to promote the decomposition by applying electromagnetic wave and also to prevent undecomposed residues from sticking on the inner surface of the cavity and from scattering, which sometimes occurs. The catalytic material is suitably selected from Pt-group elements, other catalytic compounds and substances.

Figure 10:
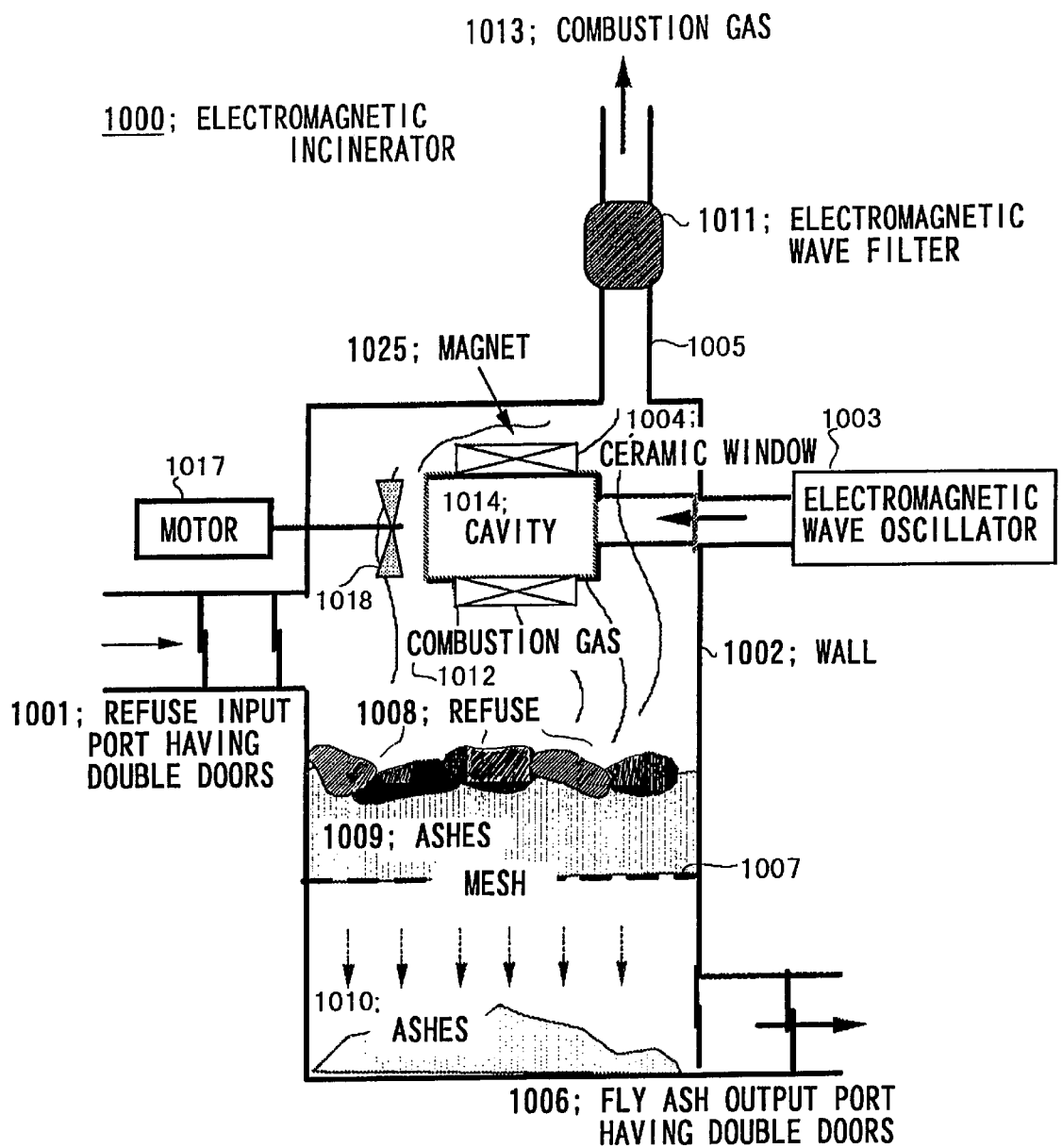
FIG. 10 is a view showing the 9th example of the constitution of the inventive incineration.

FIG. 10 is a view showing the constitution of the inventive refuse incinerator employed in the following 9th example. Referring to FIG. 10, the refuse incinerator of the present invention employed in the 9th example is the same with that employed in the above 7th example shown in FIG. 7 except that a magnetizer is added. A magnetizer 1025 (magnet) is installed in a cavity 1014 placed in the incinerator, thereby the absorption of electromagnetic wave into combustion gas increases. As for the magnetizer 1025, an electromagnet is preferably used, whereas a permanent magnet may be used of cooled and kept at temperatures of not more than its Curie temperature. Alternatively, the cavity 1014 may be disposed partly outside/partly inside the incinerator wall 1002, or just outside the wall 1002, so far as the recirculation of the combustion gas is assured, e.g., via a returning conduit (not shown). Note, the same applies also to the embodiments of FIG. 8 or FIG. 5.

In all the above examples, dioxins is taken up as a chemical substance to be treated. However, other chemical substances can be treated similarly, i.e., as explained in the above by determining suitably a resonance frequency and/or modifying fittingly other conditions depending on the kind of chemical substances according to the principle employed and explained in the present invention.

The scope of the invention is not restricted to the disclosed embodiments, and it is intended that all changes based on the appended claims, the embodiments of the invention, elements and parts disclosed in the examples are embraced in the scope of the invention.

The meritorious effect of the present invention are summarized as follows.

As explained in the above, according to one aspect of the present invention, harmful substances such as dioxins can be removed effectively at low costs. Accordingly, the value of the present invention is very great from a practical standpoint.

Further, according to one aspect of the present invention, specific chemical substances such as dioxins can be selectively heated and decomposed. This means that raising combustion temperature becomes unnecessary in case of applying the technology essentially employed in the present invention in a refuse incinerator. Accordingly, costs and energy can be reduced, and the life of the incinerator can be prolonged.

Moreover, according to one aspect of the present invention, the absorption of electromagnetic wave can be increased by forming magnetic field inside a chamber with a magnetizer and at the same time by applying electromagnetic wave to remove harmful substances such as dioxins effectively.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An incineration treatment apparatus comprising an electromagnetic wave oscillator and an oven, wherein said electromagnetic wave oscillator is adapted so that electromagnetic wave emitted from said oscillator is introduced into said oven to irradiate the electromagnetic wave to dioxins-containing combustion gas.

2. The apparatus as defined in claim 1, which further comprises a chimney section for discharging said combustion gas and an electromagnetic wave filter therein for preventing electromagnetic radiation from passing through.

3. The apparatus as defined in claim 2, which further comprises a cavity positioned in said chimney section upstream of said filter for applying the electromagnetic wave, wherein said combustion gas is introduced into said cavity, exposed inside said cavity to the electromagnetic wave emitted by said electromagnetic wave oscillator, and thereafter discharged as incineration gas through said filter.

4. The apparatus as defined in claim 3, wherein said electromagnetic wave filter is equipped with plural metallic hollow pipes each being open-ended and aligned in the flowing direction of said combustion gas, the diameter of said pipe being smaller than the wavelength of said electromagnetic wave, and the length of said pipe being longer than said wavelength.

5. The apparatus as defined in claim 3, which further comprises:
   a sensor for detecting the concentration of dioxins contained in an exhausted gas; and
   an output control unit for outputting a control signal for variably controlling the magnitude of the electromagnetic wave applied to the combustion gas depending on the output of said sensor,
   wherein said electromagnetic wave oscillator receives said control signal from said output control unit and changes the output power of electromagnetic wave.

6. The apparatus as defined in claim 3, which further comprises a fan for stirring the combustion gas and the electromagnetic wave in said oven, and a motor for driving said fan.

7. The apparatus as defined in claim 3, which further comprises an electromagnetic irradiation unit for applying electromagnetic wave to fly ashes in said oven.

8. The apparatus as defined in claim 3, which further comprises a cavity for applying electromagnetic wave inside said oven,
   wherein said combustion gas in said oven is introduced into said cavity, exposed inside said cavity to electromagnetic wave emitted by said electromagnetic wave oscillator, and thereafter discharged out of said cavity,
   a part of the discharged gas is introduced into said cavity again, and exposed to said electromagnetic wave, and
   the rest part of the discharged gas is exhausted as incineration gas through said electromagnetic wave filter.

9. A refuse incinerating apparatus comprising the incineration treatment apparatus as defined in claim 3.

10. The apparatus as defined in claim 2, wherein said electromagnetic wave filter is equipped with plural metallic hollow pipes each being open-ended and aligned in the flowing direction of said combustion gas, the diameter of said pipe being smaller than the wavelength of said electromagnetic wave, and the length of said pipe being longer than said wavelength.

11. The apparatus as defined in claim 10, which further comprises:
   a sensor for detecting the concentration of dioxins contained in an exhausted gas; and
   an output control unit for outputting a control signal for variably controlling the magnitude of the electromagnetic wave applied to the combustion gas depending on the output of said sensor,
   wherein said electromagnetic wave oscillator receives said control signal from said output control unit and changes the output power of electromagnetic wave.

12. The apparatus as defined in claim 2, which further comprises:
   a sensor for detecting the concentration of dioxins contained in an exhausted gas; and an output control unit for outputting a control signal for variably controlling the magnitude of the electromagnetic wave applied to the combustion gas depending on the output of said sensor, wherein said electromagnetic wave oscillator receives said control signal from said output control unit and changes the output power of electromagnetic wave.

13. The apparatus as defined in claim 2, which further comprises an electromagnetic irradiation unit for applying electromagnetic wave to fly ashes in said oven.

14. The apparatus as defined in claim 2, which further comprises a cavity for applying electromagnetic wave inside said oven, wherein said combustion gas in said oven is introduced into said cavity, exposed inside said cavity to electromagnetic wave emitted by said electromagnetic wave oscillator, and thereafter discharged out of said cavity, a part of the discharged gas is introduced into said cavity again, and exposed to said electromagnetic wave, and the rest part of the discharged gas is exhausted as incineration gas through said electromagnetic wave filter.

15. The apparatus as defined in claim 2, which further comprises a re-combustion chamber for inflowing and re-combusting said combustion gas, wherein the resultant gas re-combusted in said chamber is exhausted.

16. A refuse incinerating apparatus comprising the incineration treatment apparatus as defined in claim 15 as an incinerator.

17. The apparatus as defined in claim 1, which further comprises:

a sensor for detecting the concentration of dioxins contained in an exhausted gas; and an output control unit for outputting a control signal for variably controlling the magnitude of the electromagnetic wave applied to the combustion gas depending on the output of said sensor, wherein said electromagnetic wave oscillator receives said control signal from said output control unit and changes the output power of electromagnetic wave.

18. The apparatus as defined in claim 17, which further comprises an electromagnetic irradiation unit for applying electromagnetic wave to fly ashes in said oven.

19. A refuse incinerating apparatus comprising the incineration treatment apparatus as defined in claim 17.

20. The apparatus as defined in claim 1, which further comprises a fan for stirring the combustion gas and the electromagnetic wave in said oven, and a motor for driving said fan.

21. The apparatus as defined in claim 1, which further comprises an electromagnetic irradiation unit for applying electromagnetic wave to fly ashes in said oven.

22. The apparatus as defined in claim 21, which further comprises an electromagnetic irradiation unit applying electromagnetic wave to fly ashes in said oven.

23. The apparatus as defined in claim 21, which further comprises a cavity for applying electromagnetic wave inside said oven, wherein said combustion gas in said oven is introduced into said cavity, exposed inside said cavity to electromagnetic wave emitted by said electromagnetic wave oscillator, and thereafter discharged out of said cavity, a part of the discharged gas is introduced into said cavity again, and exposed to said electromagnetic wave, and the rest part of the discharged gas is exhausted as incineration gas through said electromagnetic wave filter.

24. The apparatus as defined in claim 1, wherein an inside wall of said oven is made of ceramics, and an outside wall of said oven is made of electromagnetic radiation shielding metal.

25. The apparatus as defined in claim 1, wherein a refuse input port and a fly ash output port of said oven have a double door structure.

26. The apparatus as defined in claim 1, which further comprises a cavity for applying electromagnetic wave inside said oven, wherein said combustion gas in said oven is introduced into said cavity, exposed inside said cavity to electromagnetic wave emitted by said electromagnetic wave oscillator, and thereafter discharged out of said cavity, a part of the discharged gas is introduced into said cavity again, and exposed to said electromagnetic wave, and the rest part of the discharged gas is exhausted as incineration gas through said electromagnetic wave filter.

27. A refuse incinerating apparatus comprising the incineration treatment apparatus as defined in claim 26.

28. The apparatus as defined in claim 26, wherein said cavity has at least on the inner face thereof a surface of catalytic material or a coating layer of catalytic material.

29. The apparatus as defined in claim 1, wherein said electromagnetic wave oscillator comprises at least one oscillator emitting electromagnetic wave of microwave band resonant with dioxins or dioxins and benzene.

30. A refuse incinerating apparatus comprising the incineration treatment apparatus as defined in claim 29.

31. A refuse incinerating apparatus comprising the incineration treatment apparatus as defined in claim 1.

32. The apparatus as defined in claim 1, which further comprises a re-combustion chamber for inflowing and re-combusting said combustion gas, wherein the resultant gas re-combusted in said chamber is exhausted.

33. The apparatus as defined in claim 32, wherein the electromagnetic wave oscillated by said oscillator is applied to the inside of said chamber.

34. The apparatus as defined in claim 33, wherein said chamber is disposed in said chimney section.

35. The apparatus as defined in claim 33, wherein said re-combustion chamber is provided with a magnetizer for forming magnetic field inside said re-combustion chamber.

36. The apparatus as defined in claim 33, wherein said re-combustion chamber has a cavity for applying electromagnetic wave.

37. The apparatus as defined in claim 33, wherein said cavity is provided with a magnetizer for forming magnetic field inside said cavity.

38. The apparatus as defined in claim 1, which further comprises:

a cavity positioned in said oven; and a fan near said cavity, said fan being driven by a motor positioned outside said apparatus;

wherein the combustion gas in said oven is introduced into said cavity, exposed inside said cavity to the electromagnetic wave emitted by said electromagnetic wave oscillator, and introduced again into said cavity to circulate after being discharged out of said cavity.

39. The apparatus as defined in claim 38, wherein fuel is introduced in said cavity to re-combust said combustion gas.

40. The apparatus as defined in claim 38, wherein said cavity has at least on the inner face thereof a surface of catalytic material or a coating layer of catalytic material.

* * * * *